United States Patent
Kim et al.

(10) Patent No.: US 10,368,263 B2
(45) Date of Patent: Jul. 30, 2019

(54) METHOD FOR FORMING BEARER FOR PUBLIC SAFETY IN WIRELESS COMMUNICATION SYSTEM AND DEVICE THEREFOR

(71) Applicant: Samsung Electronics Co., Ltd., Gyeonggi-do (KR)

(72) Inventors: Sunghoon Kim, Suwon-si (KR); Hoyeon Lee, Hwaseong-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/567,364

(22) PCT Filed: May 2, 2016

(86) PCT No.: PCT/KR2016/004606
§ 371 (c)(1),
(2) Date: Oct. 17, 2017

(87) PCT Pub. No.: WO2016/175634
PCT Pub. Date: Nov. 3, 2016

(65) Prior Publication Data
US 2018/0109972 A1    Apr. 19, 2018

Related U.S. Application Data (60) Provisional application No. 62/155,169, filed on Apr. 30, 2015.

(51) Int. Cl.
*H04W 4/00*    (2018.01)
*H04W 28/02*    (2009.01)
(Continued)

(52) U.S. Cl.
CPC ....... *H04W 28/0268* (2013.01); *H04W 28/02* (2013.01); *H04W 68/02* (2013.01);
(Continued)

(58) Field of Classification Search
CPC ... H04W 28/02; H04W 28/0268; H04W 4/90; H04W 68/02; H04W 72/046; H04W 72/12; H04W 76/00; H04W 76/12
See application file for complete search history.

(56) References Cited

U.S. PATENT DOCUMENTS

2010/0297979 A1    11/2010    Watfa et al.
2012/0244828 A1    9/2012    Tiwari
(Continued)

FOREIGN PATENT DOCUMENTS

EP    2503838 A2    9/2012
JP    2014-011643 A    1/2014
(Continued)

OTHER PUBLICATIONS

European Patent Office, "Supplementary European Search Report," European Application No. EP 16786820.7, dated Mar. 23, 2018, 8 pages.
(Continued)

*Primary Examiner* — Minh Trang T Nguyen (57) ABSTRACT

The present disclosure relates to a 5G or pre-5G communication system for supporting a higher data transmission rate beyond a 4G communication system, such as LTE. A method for forming a bearer by a mobility management entity (MME) according to an embodiment of the present invention comprises the steps of: receiving a first message including information regarding public safety; and forming a bearer having a priority higher than that of a preset bearer on the basis of the received message. The above-described
(Continued)

method makes it possible to form a bearer having a high priority for using a public safety service.

15 Claims, 6 Drawing Sheets

(51) Int. Cl.
   *H04W 68/02* (2009.01)
   *H04W 72/12* (2009.01)
   *H04W 76/00* (2018.01)
   *H04W 76/12* (2018.01)
   *H04W 72/04* (2009.01)
   *H04W 4/90* (2018.01)

(52) U.S. Cl.
   CPC ......... *H04W 72/046* (2013.01); *H04W 72/12* (2013.01); *H04W 76/00* (2013.01); *H04W 76/12* (2018.02); *H04W 4/90* (2018.02)

(56) References Cited

U.S. PATENT DOCUMENTS

| | | |
|---|---|---|
| 2013/0287012 A1 | 10/2013 | Pragada et al. |
| 2013/0329559 A1 | 12/2013 | Cabrera |
| 2014/0101303 A1 | 4/2014 | Gupta et al. |
| 2015/0065080 A1 | 3/2015 | Suh et al. |
| 2016/0212737 A1 | 7/2016 | Jang et al. |
| 2016/0302048 A1* | 10/2016 | Suzuki ................. H04W 4/10 |
| 2017/0289776 A1* | 10/2017 | Kim ..................... H04W 4/08 |

FOREIGN PATENT DOCUMENTS

| | | |
|---|---|---|
| WO | 2009-097818 A1 | 8/2009 |
| WO | 2010-120689 A2 | 10/2010 |
| WO | 2013116476 A2 | 8/2013 |

OTHER PUBLICATIONS

3GPP TR 23.779 V0.5.0 (Jan. 2015), Technical Report, 3rd Generation Partnership Project; Technical Specification Group Services and System Aspects; Study on application architectural to support Mission Critical Push to Talk over LTE (MCPTT) services (Release 13), 91 pages.

Hallahan et al.; "Policies for Public Safety Use of Commercial Wireless Networks"; 38th Telecommunications Policy Research Conference 2010; Arlington, Virginia, USA; Oct. 1-3, 2010; https://ssrn.com/abstract=1989600; 34 pages.

* cited by examiner

METHOD FOR FORMING BEARER FOR PUBLIC SAFETY IN WIRELESS COMMUNICATION SYSTEM AND DEVICE THEREFOR

CROSS-REFERENCE TO RELATED APPLICATIONS AND CLAIM OF PRIORITY

The present application claims priority under 35 U.S.C. § 365 to International Patent Application No. PCT/KR2016/004606 filed May 2, 2016, entitled "METHOD FOR FORMING BEARER FOR PUBLIC SAFETY IN WIRELESS COMMUNICATION SYSTEM AND DEVICE THEREFOR", which claims priority under 35 U.S.C. § 365 and/or 35 U.S.C. § 119(e) to U.S. Provisional Patent Application No. 62/155,169 filed Apr. 30, 2015, each of which are incorporated herein by reference into the present disclosure as if fully set forth herein.

TECHNICAL FIELD

The present invention relates to a wireless communication system and, in particular, to a method and device for facilitating establishment of bearers for public safety network.

BACKGROUND

In order to meet the increasing demand for wireless data traffic since the commercialization of 4G communication systems, the development focus is on the 5th generation (5G) or pre-5G communication system. For this reason, the 5G or pre-5G communication system is called a beyond 4G network communication system or post long-term evolution (LTE) system.

Consideration is being given to implementing the 5G communication system in millimeter wave (mmWave) frequency bands (e.g., 60 GHz bands) to accomplish higher data rates. In order to increase the propagation distance by mitigating propagation loss in the 5G communication system, discussions are underway about various techniques such as beamforming, massive multiple-input multiple-output (MIMO), full dimensional MIMO (FD-MIMO), array antenna, analog beamforming, and large-scale antenna.

Also, in order to enhance network performance of the 5G communication system, developments are underway of various techniques such as evolved small cell, advanced small cell, cloud radio access network (cloud RAN), ultra-dense network, device to device (D2D) communication, wireless backhaul, moving network, cooperative communication, coordinated multi-points (CoMP), and interference cancellation.

Furthermore, the 5G communication system adopts an advanced coding modulation (ACM) scheme such as FQAM (i.e., combination of frequency shift keying (FSK) and quadrature amplitude modulation (QAM)) and sliding window superposition coding (SWSC) and an enhanced network access scheme such as filter bank multi carrier (FBMC), non-orthogonal multiple access (NOMA), and sparse code multiple access (SCMA).

Meanwhile, there is a need of prioritizing public safety communication in comparison with normal communications in a public safety network (public safety LTE or PS-LTE).

SUMMARY

In order to meet the above requirement, the present invention provides a method and device for assigning a high priority to a terminal which uses a public safety network and assigning resources to the terminal with priority.

In accordance with an aspect of the present invention, a bearer establishment method of a mobility management entity (MME) includes receiving a first message including information on a public safety network and establishing a bearer with a priority higher than the priority of a preconfigured bearer.

In accordance with another aspect of the present invention, a mobility management entity (MME) includes a transceiver which transmits and receives signals and a controller which controls the transceiver to receive a first message including information on public safety network and configures a bearer with a priority higher than the priority of a preconfigured bearer.

The present invention is advantageous in terms of assigning a high priority to a terminal which uses the public safety network and allocating resources to the terminal with priority.

DETAILED DESCRIPTION

The public safety LTE (PS-LTE) provides users with a public security communication service using a mission critical push to talk over LTE (MCPTT) technology. The MCPTT standard of the 3GPP supports functionalities of D2D group communication, person-to-person communication, emergency call, disaster alert, and ambient listening. The MCPTT service architecture is comprised of an evolved packet system (EPS), a session initiation protocol (SIP) core, and MCPTT application server. The EPS may denote an LTE network, and the SIP Core may denote the network comprised of core network entities operating over SIP such as internet multimedia subsystem (IMS). The MCPTT application server may be deployed in various fashions. An MCPTT provider may operate the EPS, the SIP core, and even the MCPTT application server, and the MCPTT provider operating the SIP core and MCPTT application server may provide the service in interoperation with the EPS s of other providers. The MCPTT provider may also operate only the MCPTT application server and provide the service in interoperation with the EPS and SIP core of other providers.

The MCPTT service may include group calls, person-to-person calls, and emergency alerts. The group call service supports a normal call for public security, an emergency call with the highest priority for the case of urgency/emergency situation, and an imminent peril call for the urgency/emergency situation with the priority lower than that of the emergency call. The person-to-person call service supports the normal call and an ambient listening function for listening the ambient sound around the counterpart. The emergency alert service is capable of alerting the urgent/emergent situation to the MCPTT system or other MCPTT users.

The emergency call service of the MCPTT supports the group call unlike the legacy emergency call and thus the UE has to have the capability of receiving as well as transmitting the emergency call. The emergency call, imminent peril call, and emergency alert may be handled with priorities higher than that of the normal call at the EPS, SIP Core, and MCPTT Application Server. Thus, such high priority calls have requirements for fast connection establishment and data exchange in comparison with the other calls.

The present invention proposes a method for assigning a high priority to the terminal operating in the public-safety network (MCPTT) in order for the MCPTT terminal to be allocated resource and to establish a connection with priority for data transmission in EPS. The current EPS-based emergency call service is designed in consideration of only the mobile originated situation without control on the emergency MCPTT service. However, the MCPTT service may have a high priority for dedicated-MCPTT terminal network service in comparison with the normal service, and this requirement should be applied to the EPS. Also, since the MCPTT supports receiving/transmitting a group call or person-to-person call, the service can be supported in a mobile terminated situation where the MCPTT terminal has to reply to an MCPTT call as well as the mobile originated situation.

Also, the present invention proposes a method for allocating a high priority to a MCPTT terminal connected to the MCPTT system, allocating radio resources for the high priority MCPTT service, and notifying the MCPTT system that the terminal attempting to access the system is an MCPTT terminal.

Throughout the specification, the term MCPTT is intended to include public safety service called by different names but supporting the D2D group call, person-to-person call, and urgency/emergency call. The embodiments of the present invention may be applied to various radio communication systems such as WLAN and Bluetooth, as well as the communication system described herein, in a similar manner. In the present invention, the priority of the MCPTT service may be the priority allocated to one of the MCPTT services, e.g. emergency call service having the highest priority and imminent peril call service having the next highest priority. The present invention is directed to a method for allocating a priority to an MCPTT terminal and notifying the EPS network that it is an MCPTT-enabled terminal in a mobile originated scenario in which the MCPTT terminal initiates connection to the EPS network with priority and a mobile terminated scenario in which the MCPTT terminal receives a paging from the EPS network for triggering a connection with priority. In the present invention, the MCPTT service is divided into a MCPTT Normal Call denoting a basic MCPTT call, an Emergency Call with the highest priority, an Imminent Peril Call with the next highest priority, and an Ambient Listening for allowing listening to ambient sounds and an Emergency Alert with respective priorities.

Throughout the specification, the term EPS is the acronym of Evolved Packet System and interchangeable with LTE network. The EPS is comprised of E-UTRAN(s) including terminals and eNB and evolved packet core (EPC) as a core network of the LTE system. Throughout the specification, the EPS connects to the SIP Core as a network of core network nodes operating over the session initiation protocol (ISP) for the MCPTT service and may denote the Internet multimedia subsystem (IMS). Accordingly, an IMS entity such as proxy-call session control function (P-CSCF) as shown in the present invention denotes an SIP Core entity for MCPTT. Throughout the specification, the MCPTT Application Server denotes a network entity for exchanging application layer information and may be any of various logical/physical entity required for implementing the MCPTT service without being limited to the term 'Application Server'.

Figure 1:
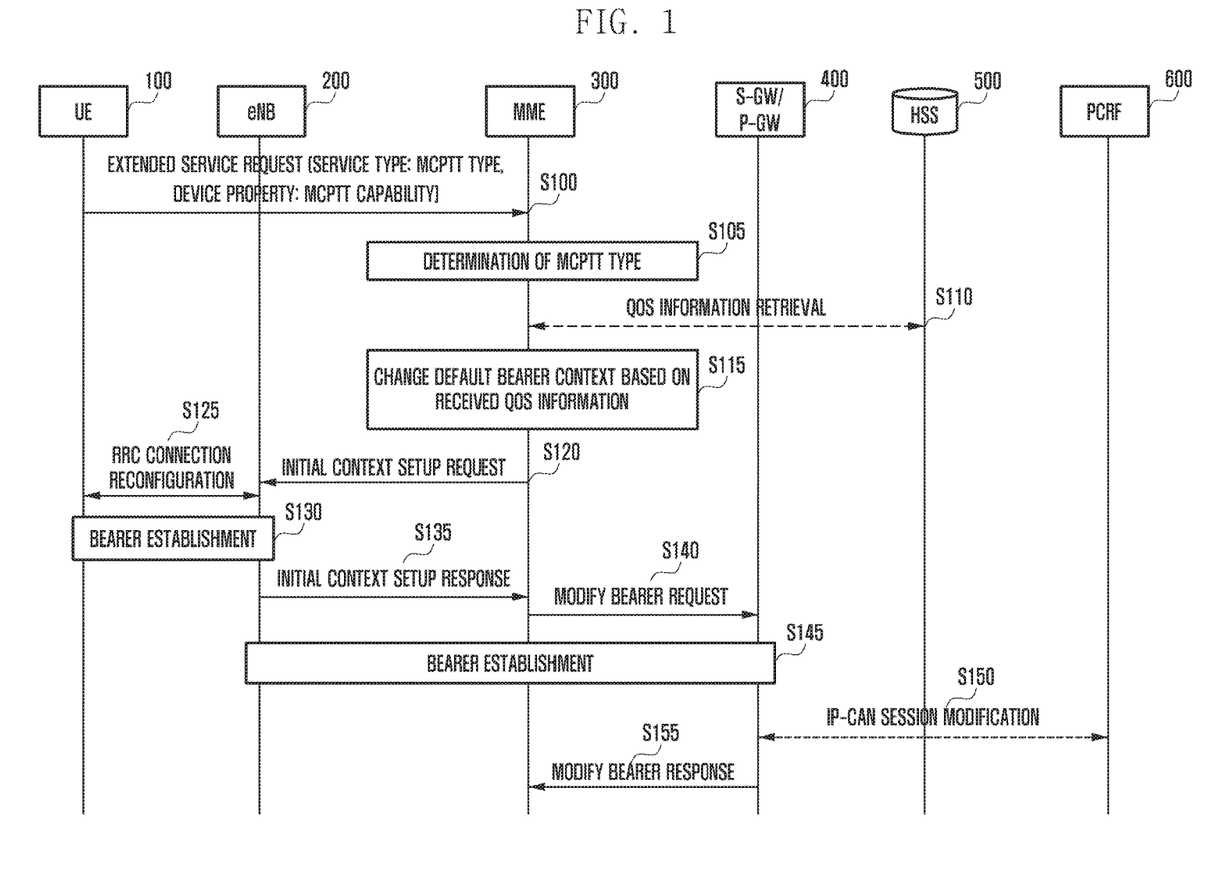
FIG. 1 is a signal flow diagram illustrating a bearer context modification procedure in which a terminal transmits a service request to an MME in order for the MME to modify the bearer context for use of the public safety network according to an embodiment of the present invention.

FIG. 1 is a signal flow diagram illustrating a bearer context modification procedure according to an embodiment of the present invention in which a terminal (user equipment or UE) transmits a service request to a mobility management entity (MME) in order for the MME to modify the bearer context for use of the public safety network.

As shown in FIG. 1, the MCPTT UE 100 may transmit to the MME 300 an Extended Service Request message to the EPS network for establishing an MCPTT connection and be allocated a bearer with the priority designated for MCPTT.

FIG. 1 depicts a method and procedure for establishing a bearer with a QoS appropriate for MCPTT in such a way that the UE 100 transmit a MCPTT service request message to the MME 300. The MCPTT UE 100 has to activate an EPS network bearer for use of the MCPTT service and may trigger the activation procedure by transmitting the Extended Service Request message to the MME 300.

In detail, the MCPTT UE 100 may transmit to the MME 300 a service request message including at least one of MCPTT type and MCPTT capability.

The Extended Service Request message may include a Service Type Field set, by the MCPTT UE 100, to a value indicating an MCPTT service type. For example, the service type field may be set to a value indicating MCPTT service collectively or one of MCPTT services categorized according to the MCPTT emergency situations. The MCPTT service types may be categorized into MCPTT Group Call, MCPTT Emergency Call, MCPTT Imminent Peril Call, MCPTT Emergency Alert, Ambient Listening, and Private Call.

The MCPTT Emergency Call may fall into one of MCPTT Emergency Group Call for emergency group communication and MCPTT Emergency Private Call for emergency peer-to-peer communication.

The MCPTT UE 100 may inform that it is an MCPTT-enabled UE explicitly by setting a Device Property field of the Extended Service Request message to a value indicative of the MCPTT-enabled UE. The Device Property field indicates the MCPTT service capability and may be set to a value indicative of the MCPTT-enabled UE collectively or one of sub-categorized MCPTT Emergency call service-enabled UEs. In more detail, the Device Property field may be set to a value indicative of one of the MCPTT services such as MCPTT Emergency Call, MCPTT Imminent Peril Call, MCPTT Ambient Listening, and MCPTT Private call. In the case that the Service Type or Device Property field is set to a value indicative of an MCPTT Emergency service, the detailed MCPTT Emergency service may vary depending on the EPS network operator or MCPTT service provider. In order to make a resource request to the EPS network, the MCPTT UE 100 may use the Extended Service Request message for the MCPTT Emergency service or a Service Request message for normal MCPTT service.

Next, the MME 300 may determine the type of the MCPTT service at step S105.

In detail, if the Extended Service Request message is received, the MME 300 checks at least one of the Service Type and Device Property fields of the Extended Service Request message to determine the MCPTT service to provide.

For example, the MME 300 may determine whether the requested service is the collective MCPTT service, Emergency Call, Imminent Peril Call, Ambient Listening, Private Call, or Emergency Alert.

The MME 300 may determine that the MCPTT UE 100 requests for the MCPTT Emergency service and then apply a QoS designated for the Emergency service.

For example, the MME 300 may inquire to a home subscriber server (HSS) 500 about the QoS for establishing a public safety service bearer at step S110. In detail, after identifying and authenticating the type of MCPTT service requested by the MCPTT UE 100, the MME 300 may inquire to the HSS 500 about the QoS information for providing the MCPTT UE 100 with the identified MCPTT service. The QoS information may include a QoS class identifier (QCI) indicative of QoS priority and an allocation and retention priority (ARP) indicating whether it is possible to preoccupy resources. The MME 300 may store the acquired information as its internal setting value or in the form of MME Emergency Configuration Data for use in the remaining part of the procedure.

The process between the MME 300 and the HSS 500 may be omitted and, in this case, the QoS may be determined according to a preconfigured internal value stored in the MME. For example, the preconfigured internal value of the MME 300 may be stored in the form of MME Emergency Configuration Data.

At step S115, the MME 300 may modify the context of a default bearer based on the QoS information received from the HSS 500.

In detail, the MME 300 may determine the QoS in response to the Extended Service Request message transmitted by the MCPTT UE 100 and modify the context of the default bearer set up for the UE which has transmitted the request message to be appropriate for the MCPTT service. For example, it is determined to provide the MCPTT UE which has transmitted the Extended Service Request message with the MCPTT Emergency service, the MME 300 may modify the Default Bearer Context based on the QCI or ARP designated for the MCPTT service.

Then, the MME 300 may transmit an Initial Context Setup Request message to a base station (evolved Node B or eNB) 200 at step S120.

For example, the MME 300 may modify the default bearer context established for the MCPTT UE 100 to be fit for the MCPTT service or the Emergency service (or a type of the Emergency service) and transmit an Initial Context Setup Request message to the eNB 200 to request for establishing a bearer with the UE 100 according to the modified bearer context.

The eNB 200 may reestablish a radio resource control (RRC) connection with the MCPTT UE 100 at step S125.

In detail, upon receipt of the Initial Context Setup Request message from the MME 300, the eNB may prepare for creating a bearer according to the bearer context, i.e., QoS information, contained in the Initial Context Request message and transmit an RRC Connection Reconfiguration message to the MCPTT UE 100 to establish a bearer between the UE 100 and the eNB 200 at step S130.

After establishing the bearer with the MCPTT UE 100, the eNB 200 may transmit an Initial Context Setup Response message to the MME 300 at step S135. In detail, the eNB 200 may transmit to the MME 300 the Initial Context Setup Response message to notify the MME 300 of the bearer ID indicating the bearer established with the QoS configured by the MME 300 in response to the Initial Context Setup Request message.

Upon receipt of the Initial Context Setup Response message, the MME 400 may transmit a Modify Bearer Request message to a Serving Gateway/Packet Data Network Gateway (S-GW/P-GW) 400, at step S140, to request for establishing a connection between the eNB 200 and the S-GW/P-GW 400. As a consequence, a bearer is established between the eNB 200 and the S-GW/P-GW 400 at step S145.

The bearer connection established between the UE 100 and the S-GW/P-GW 400 via the eNB 200 may be a connection supporting the QoS set by the MME 300 to be fit for the MCPTT type and may be handled with priority in comparison with other bearers.

After the bearer connection establishment is completed, the P-GW 400 may modify an IP-CAN session with a policy and charging rules function (PCRF) 600 at step S150. For example, the P-GW 400 may transmit the information on the newly established bearer and UE information to the PCRF 600 to update a policy and charging control (PCC) rule for use in charging or providing services.

The S-GW/P-GW 400 may transmit a Modify Bearer Response message to the MME 300 at step S155.

Figure 2:
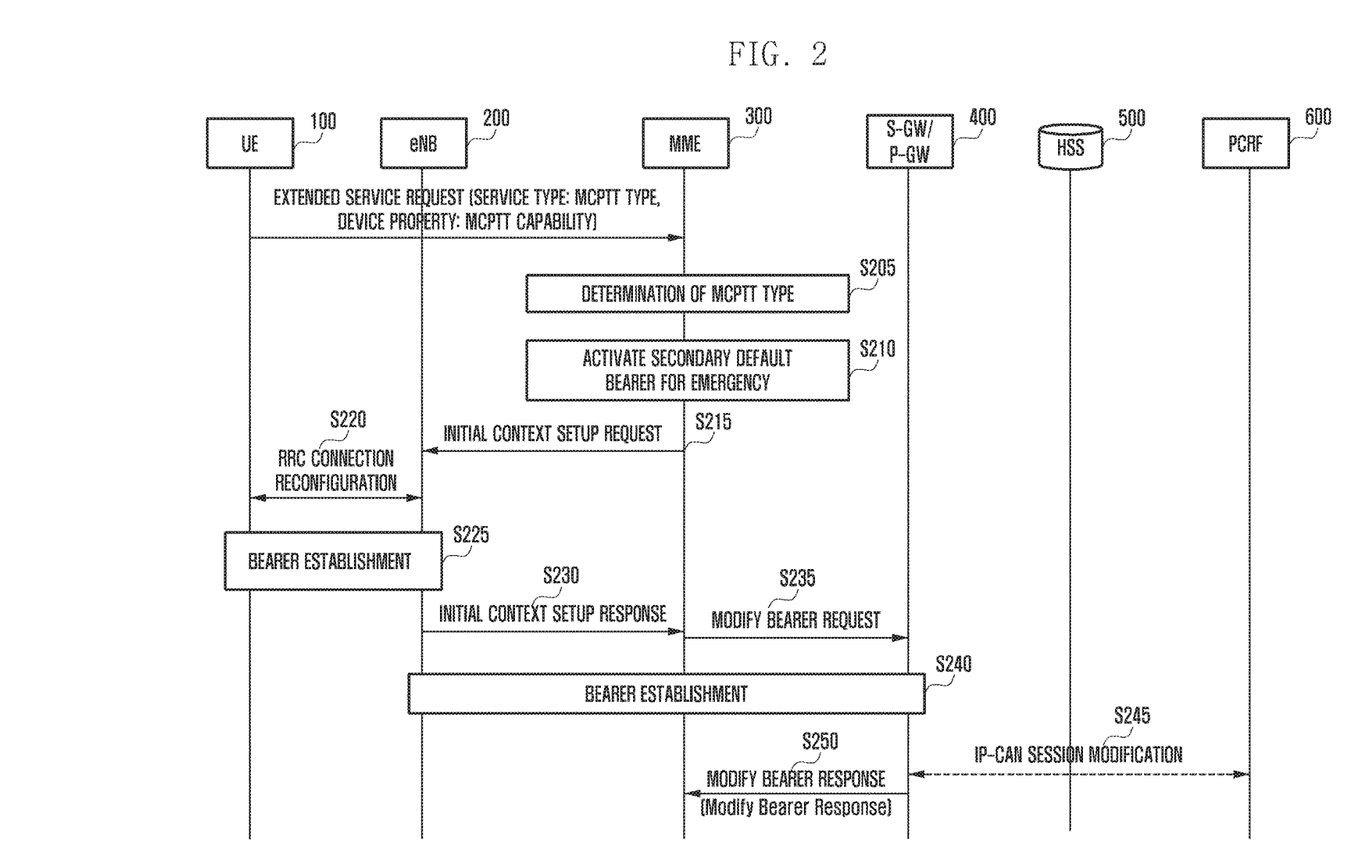
FIG. 2 is a signal flow diagram illustrating a procedure for activating a secondary bearer context for use of a public security network in which a UE transmit a public safety network request to an MME in order for the MME to activate the secondary bearer context according to an embodiment of the present invention.

FIG. 2 is a signal flow diagram illustrating a procedure for activating a secondary bearer context for use of a public security network in which a UE transmit a public safety network request to an MME in order for the MME to activate the secondary bearer context according to an embodiment of the present invention.

As shown in FIG. 2, the MCPTT UE 100 may be allocated radio resources for a bearer with a priority designated for MCPTT by transmitting to the MME 300 an Extended Service Request message requesting for establishing a connection for MCPTT through an EPS network. It is obvious that the term 'emergency' in use for the following description with reference to the drawing is intended to indicate the collective MCPTT service, MCPTT Emergency, or one of detailed MCPTT services.

In detail, the MCPTT UE 100 transmits an Extended Service Request message to the MME 300 at step S200 to request for activating an EPS bearer for use of the MCPTT service. The Extended Service Request message may include a service type field set, by the MCPTT UE 100, to a value indicating an MCPTT service type. For example, the service type field may be set to a value indicating MCPTT service collectively or one of MCPTT services categorized according to the MCPTT emergency situations. The MCPTT service types may be categorized into MCPTT Group Call, MCPTT Emergency Call, MCPTT Imminent Peril Call, MCPTT Emergency Alert, Ambient Listening, and Private Call.

The MCPTT Emergency Call may fall into one of MCPTT Emergency Group Call for emergency group communication and MCPTT Emergency Private Call for emergency peer-to-peer communication.

The MCPTT UE 100 may inform that it is an MCPTT-enabled UE explicitly by setting a Device Property field of the Extended Service Request message to a value indicative of the MCPTT-enabled UE. The Device Property field indicates the MCPTT service capability and may be set to a value indicative of the MCPTT-enabled UE collectively or one of sub-categorized MCPTT Emergency call service-enabled UEs. In more detail, the Device Property field may be set to a value indicative of one of the MCPTT services such as MCPTT Emergency Call, MCPTT Imminent Peril Call, MCPTT Ambient Listening, and MCPTT Private call. In the case that the Service Type or Device Property field is set to a value indicative of an MCPTT Emergency service, the detailed MCPTT Emergency service may vary depending on the EPS network operator or MCPTT service provider. In order to make a resource request to the EPS network, the MCPTT UE 100 may use the Extended Service Request message for the MCPTT Emergency service or a Service Request message for normal MCPTT service.

Next, the MME 300 may determine the type of the MCPTT service at step S205.

In detail, if the Extended Service Request message is received, the MME 300 checks at least one of the Service Type and Device Property fields of the Extended Service Request message to determine the MCPTT service to provide.

For example, the MME 300 may determine whether the requested service is the collective MCPTT service, Emergency Call, Imminent Peril Call, Ambient Listening, Private Call, or Emergency Alert.

The MME 300 may determine the MCPTT UE 100 requests for the MCPTT Emergency service and then apply a QoS designated for the Emergency service. This embodiment is identical with the embodiment of FIG. 1 with the exception that the MME 300 has a Secondary Default Bearer Context for MCPTT in order to allocate a bearer supporting the QoS designated for MCPTT when the MCPTT service is requested by a UE in the state of being aware of UE's MCPTT capability. How to determine whether a UE has MCPTT capability is described later.

In detail, if the UE 100 with the MCPTT capability has tried attach, the MME 300 may configure a preserve a secondary default bearer context with the QoS for MCPTT in preparation for MCPTT service request from the UE 100. The secondary default bearer context may include a context for collective MCPTT service, MCPTT Emergency service, respective subcategories of Emergency Call, Imminent Peril Call, Ambient Listening, Private Call, and Emergency Alert. Although there can be multiple candidates of the secondary default context, a default bearer context is configured for the MCPTT service request which is differ from the legacy default bearer context and thus the context is referred to as secondary default bearer context, and it is obvious that the term secondary does not mean any specific order of a context stored in the MME. The secondary default bearer context includes corresponding QCI or ARP value.

The MME 300 may activate the secondary default bearer for the public safety service at step S210.

If the Extended Service Request message is received from the MCPTT UE 100, the MME 300 may check the MCPTT Type to determine whether the UE has the capability for the service. Afterward, the MME 300 selects the bearer context matching the MCPTT type requested by the UE among the stored bearer contexts and initiates bearer connection establishment according to QoS included in the context.

At step S215, the MME 300 transmits to the eNB 300 an Initial Context Setup Request message with the bearer context included in the secondary default bearer context. If the Initial Context Setup Request message is received, the eNB 200 may reconfigure the RRC connection at step S220. For example, the eNB 300 may prepare for establishing a bearer according to the bearer context, i.e., QoS information, included in the Initial Context Setup Request message and transmit an RRC Connection Reconfiguration message to the MCPTT UE 100 to establish a bearer between the UE 100 and the eNB 300 at step S225.

After establishing the bearer with the UE 100, the eNB 200 may transmit an Initial Context Setup Response message to the MME 300 at step S230 to notify the MME 300 of the bearer ID indicating the bearer established with the QoS configured by the MME 300 in response to the Initial Context Setup Request message.

Upon receipt of the Initial Context Setup Response message, the MME 300 may transmit a Modify Bearer Request message to the S-GW/P-GW 400 at step S235 to request for establishing a bearer connection between the eNB 200 and the S-GW/P-GW 400 at step S240.

As a consequence, a bearer is established between the eNB 200 and the S-GW/P-GW 400. The bearer connection established between the UE 100 and the S-GW/P-GW 400 via the eNB 200 may be a connection supporting the QoS set by the MME 300 to be fit for the MCPTT type and may be handled with priority in comparison with other bearers.

After the bearer connection establishment is completed, the P-GW 400 may modify the IP-CAN session with a policy and charging rules function (PCRF) 600 at step S245. For example, the P-GW 400 may transmit the information on the newly established bearer and UE information to the PCRF 600 to update a policy and charging control (PCC) rule for use in charging or providing services.

The S-GW/P-GW 400 may transmit a Modify Bearer Response message to the MME 300 at step S250.

Figure 3:
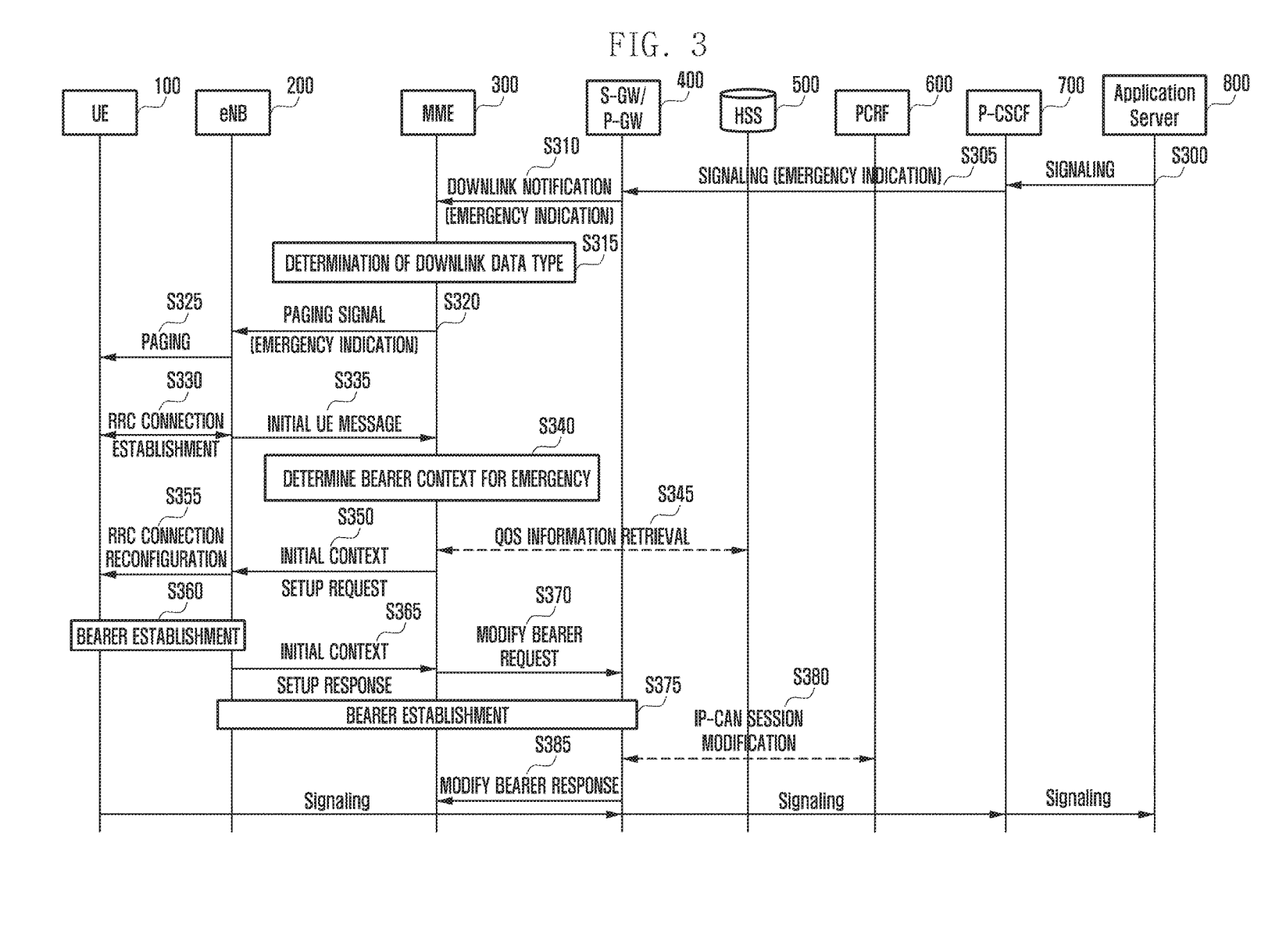
FIG. 3 is a signal flow diagram illustrating a procedure for establishing a bearer in which a UE which wants to use a public safety network receives a paging signal for the public safety network and an MME establishes a bearer for the UE according to an embodiment of the present invention.

FIG. 3 is a signal flow diagram illustrating a procedure for establishing a bearer in which a UE which wants to use a public safety network receives a paging signal for the public safety network and an MME establishes a bearer for the UE according to an embodiment of the present invention.

FIG. 3 is a diagram illustrating a procedure of paging an MCPTT UE 100 when an MCPTT service data with a high priority arrives and establishing a bearer for the MCPTT UE 100 with priority according to an embodiment of the present invention. It is obvious that the term 'emergency' in use for the following description with reference to the drawing is intended to indicate the collective MCPTT service, MCPTT Emergency, or one of detailed MCPTT services.

In FIG. 3, the UE 100 receiving an MCPTT service may operate in an idle mode. In this situation, data for use of the MCPTT service are transmitted from an MCPTT Application Server 800 to a P-CSCF 700 at step S300. The P-CSCF 700 may determine whether to handle the signal arrived from the MCPTT application server 800 with priority. It may be possible to assign a high priority for the collective MCPTT service or the MCPTT Emergency service or service-specific priorities for the respective MCPTT services such as Emergency Call, Imminent Peril Call, Ambient Listening, Private Call, and Emergency Alert.

The P-CSCF 700 may transmit to the P-GW 400 a signal including an indicator indicating a public safety network at step S305. For example, the P-CSCF 700 may transmit to the P-GW 400 an indicator indicating that the signal received from the MCPTT application server 800 has a high priority.

Alternatively, the P-CSCF 700 may request to the PCRF 600 for assigning a high priority to the data received from an IP address of the MCPTT application server 800. The PCRF 600 may request to the P-GW 400 to apply a high priority to the data arrived from the IP address of the MCPTT application server 800 by means of a PCC rule or by updating the policy.

Meanwhile, the P-GW 400 may transmit to the MME 300 a downlink data notification message including an indicator indicative of the public safety network at step S310.

In detail, if the P-GW 400 notices the arrival of a signal with a high priority, it may transmit to the MME 300 a Downlink Notification message to trigger paging of the UE 100. The P-GW 400 may add an identifier to the downlink notification message for identifying the MCPTT, MCPTT Emergency, or one of detailed MCPTT services. In order to transmit the identifier using the downlink notification message, it may be possible to set an Indication flag of the Downlink Notification message to a value indicating the MCPTT, the MCPTT Emergency, or one of detailed MCPTT services, or set the ARP of the Downlink Notification message to a value indicating the MCPTT service, the MCPTT Emergency, or one of detailed MCPTT services, or set the Paging and Service Information of the Downlink Notification message to a value indicating the MCPTT, the MCPTT Emergency service, or one of the detailed MCPTT services.

The MME 300 may determine the type of downlink data at step S315.

For example, is the Downlink Notification message is received, the MME 300 may determine whether the downlink data type is MCPTT, MCPTT emergency, or one of detailed MCPTT services.

The MME may transmit to the eNB 200 a paging signal including an indicator indicative of the public safety network at step S320. In detail, the MME 300 may transmit to the eNB 200 a paging message including an indicator indicating that the paging message is triggered for the MCPTT, the MCPTT Emergency, or one of the detailed MCPTT services so as to be handled with priority. For this purpose, the MME 300 may set a paging priority of the paging message to a value designated for the MCPTT service, the MCPTT Emergency, or one of the detailed MCPTT services.

Upon receipt of the paging message, the eNB 300 may determine to handle the paging message with priority in comparison with other paging messages.

The eNB 200 may broadcast a paging signal for paging of the MCPTT UE 100 at step S325.

The eNB 200 may establish an RRC connection with the MCPTT UE 100 at step S330. Next, the eNB 200 may transmit an initial UE message to the MME 300 at step S335.

In detail, the MCPTT UE 100 may receive the paging signal and respond to the eNB 200; upon receipt of the response, the eNB 300 may transmit the Initial UE message to the MME 300 to request for establishing a bearer for the MCPTT UE 100.

If the Initial UE message is received, the MME may determine that the paged UE 100 is requesting for bearer establishment.

Accordingly, the MME 300 may retrieve the bearer context for the public safety network at step S340. For example, the MME 300 may retrieve the context of a bearer to be allocated to the MCPTT UE 100 and set the QoS of the bearer to a value designated for the MCPTT service, the MCPTT Emergency, or one of the detailed MCPTT services.

After identifying the MCPTT to be used by the MCPTT UE 100 and authenticating the MCPTT UE 100, the MME 300 may retrieve QoS information available for the UE 100 for use of a specific MCPTT service at step S345.

The QoS information may include a CQI value indicative of QoS priority and an ARP value indicating whether it is possible to preoccupy resources.

The MME 300 may store the retrieved information as an internal configuration value or a part of the MME Emergency Configuration Data for use in the remaining part of the procedure.

Meanwhile, the procedure between the MME 300 and the HSS 500 may be omitted and, in this case, the QoS value is determined according to the internal configuration value stored in the MME 300. The internal configuration value stored in the MME 300 may be the value stored as a part of the MME Emergency Configuration Data.

The MME 300 may determine the QoS for the bearer to be allocated to the MCPTT UE 100 and update the default bearer context of the UE 100 with the QoS value designated for the MCPTT service. For example, if it is determined to provide the MCPTT Emergency service to the MCPTT UE 100 which has transmitted the Extended Service Request message, the MME 300 may update the Default Bearer Context with the QCI or ARP value designated for the corresponding service. In another embodiment of the present invention, the MME 300 may activate the Secondary Default Bearer Context stored for MCPTT.

The MME 300 may transmit to the eNB 200 an Initial Context Setup Request message at step S350. In detail, the MME 300 may transmit to the eNB 300 the Initial Context Setup Request message to request for bearer connection establishment with the UE 100 according to the configured bearer Context.

The eNB 200 may reconfigure the RRC connection with the UE 100 at step S355. In detail, if the Initial Context Setup Request message is received from the MME 300, the eNB 200 may prepare for establishing a bearer according to the bearer context, i.e., QoS information, included in the Initial Context Setup Request message and transmit an RRC Connection Reconfiguration message to the MCPTT UE 100 to establish a bearer between the UE 100 and the eNB 200 at step S360.

After establishing the bearer with the UE, the eNB 200 may transmit to the MME 300 an Initial Context Setup Response message in response to the Initial Context Setup Request message to notify the MME 350 of the bearer ID of the bearer established based on the QoS configured by the MME 300.

Upon receipt of the Initial Context Setup Response message, the MME 300 may transmit to the S-GW/P-GW a Modify Bearer Request message at step S370 for connection between the eNB 200 and the S-GW/P-GW 400 and, as a consequence, a bearer connection may be established between the eNB 200 and S-GW/P-GW 400 at step S375. The bearer connection established between the UE 100 and S-GW/P-GW 400 via the eNB 200 may fulfil the QoS configured by the MME 300 in match with the MCPTT Type so as to handle the data thereon with priority in comparison with those of other bearers.

After establishing the bearer, the P-GW 400 may perform an IP-CAN session modification process with the PCRF 600. For example, the P-GW 400 may transmit to the PCRF 600 the information on the newly established bearer and UE information to update a PCC rule for use in charging and serving provision.

Next, the S-GW/P-GW 400 may transmit a Modify Bearer Response message to the MME 300 at step 385.

Once the bearer has been established, the MCPTT UE 100 may reply to the request for the MCPTT service to receive the MCPTT service with priority.

Figure 4:
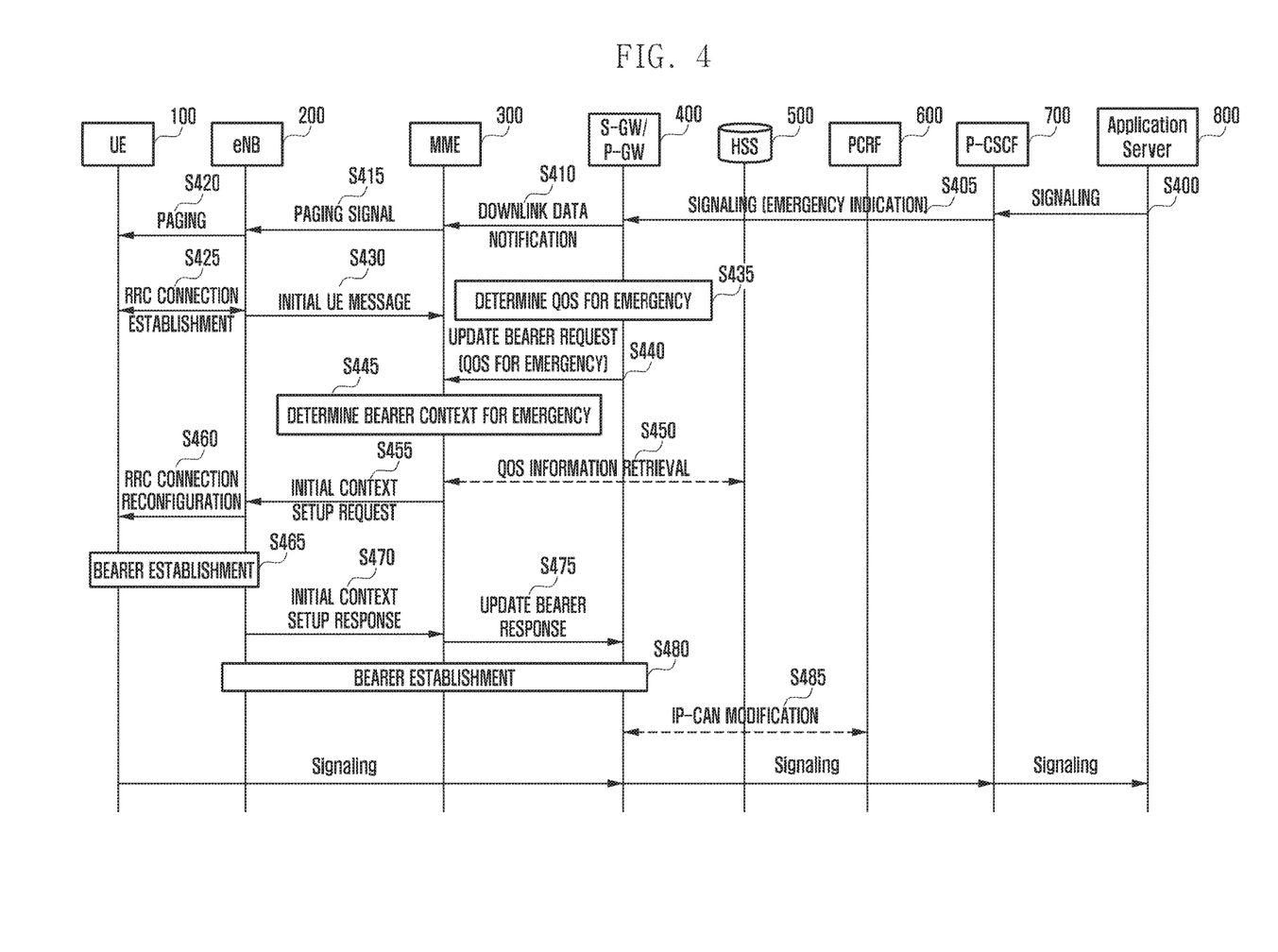
FIG. 4 is a signal flow diagram illustrating a procedure for establishing a bearer for use of a public safety network in which a P-GW receives information on the public safety network and determines the information for establishing a bearer for use of the safety network and an MME establishes the bearer for use of the public safety network according to an embodiment of the present invention.

FIG. 4 is a signal flow diagram illustrating a procedure for establishing a bearer for use of a public safety network in which a P-GW receives information on the public safety network and determines the information for establishing a bearer for use of the safety network and an MME establishes the bearer for use of the public safety network according to an embodiment of the present invention.

The embodiment of FIG. 4 is similar to the embodiment of FIG. 3 in that the P-GW 400 receives an MCPTT signaling from the P-CSCF 700.

It is obvious that the term 'emergency' in use for the following description with reference to the drawing is intended to indicate the collective MCPTT service, MCPTT Emergency, or one of detailed MCPTT services.

The embodiment of FIG. 4 is directed to a procedure for the P-GW 400 to receive a signal which is supposed to be handled with priority and then request for establishing a bearer with a high priority.

The MCPTT application server 800 may transmit MCPTT service-related data to the P-CSCF 700 at step S400. The P-CSCF 700 may determine whether the signal received from the MCPTT application server should be handled with priority. It may be possible to assign a high priority for the collective MCPTT service or the MCPTT Emergency service or service-specific priorities for the respective MCPTT services such as Emergency Call, Imminent Peril Call, Ambient Listening, Private Call, and Emergency Alert.

The P-CSCF 700 may transmit to the P-GW 400 a signal including an indicator indicating a public safety network at step S405. The P-GW 400 may transmit a paging signal to the MME 300 at step S410.

The MME 300 may transmit a paging signal to the eNB 200 at step S415. Then, the eNB 200 may broadcast the paging signal for paging of the UE 100 at step S420.

The eNB 200 may establish an RRC connection with the MCPTT UE 100 at step S425. The eNB 200 may transmit an Initial UE message to the MME 300 at step S430.

The P-GW 400 may determine a QoS designated for the public safety network at step S435. Although the description is directed to a case of determining the QoS, the P-GW 400 may determine a bearer context for establishing a bearer for the public safety network.

For example, if a signal to be handled with priority is received from the P-CSCF 700, the P-GW 400 may transmit a paging message to the MME 300 and then determine the QoS to be applied to the new bearer with a high priority.

After determining the QoS, the P-GW 400 may transmit to the MME 300 an Update Bearer Request message including the determined QoS via the S-GW at step S440. For example, the P-GW 400 may transmit to the MME 300 the Update Bearer Request message including a QoS value matching the priority determined as above.

The MME 300 may determine a bearer context for the public safety network at step S445. For example, if the Update Bearer Request message is received, the MME 300 determines the bearer context to be applied for the MCPTT UE 100 based on the information contained in the Update Bearer Request message.

For example, after checking for the type of the MCPTT service and authenticating the MCPTT UE 100, the MME 300 may inquire to the HSS 500 about the QoS information to be provided to the UE 100 for use of a specific MCPTT service.

The QoS information may include a QCI value indicative of QoS priority and an ARP indicating whether it is possible to preoccupy resources.

The MME 300 may store the acquired information as its internal setting value or in the form of MME Emergency Configuration Data for use in the remaining part of the procedure.

The process between the MME 300 and the HSS 500 may be omitted and, in this case, the QoS may be determined according to a preconfigured internal value stored in the MME. The preconfigured internal value of the MME 300 may be stored in the form of MME Emergency Configuration Data.

After determining the QoS of the bearer for the MCPTT UE 100, the MME 300 may modify the context of the default bearer of the UE which has transmitted the request to be fit for the MCPTT service. For example, the MME 300 may determine to provide the MCPTT emergency service to the MCPTT UE 100 which has transmitted the Extended Service Request message and then modify the default bearer context based on the QCI or ARP value designated for the MCPTT emergency service. Alternatively, the MME 300 may activate a Secondary Default Bearer Context stored for MCPTT.

The MME 300 may transmit an Initial Context Setup Request message to the eNB 200 at step S455. In detail, the MME 300 may transmit the Initial Context Setup Request message to the eNB 200 to request for establishing a bearer with the UE 100 according to the configured bearer context.

Then, the eNB 200 may reconfigure the RRC connection with the UE 100 at step S460. In detail, if the Initial Context Setup Request message is received from the MME 300, the eNB 200 prepares for establishing a bearer according to the bearer context, i.e., QoS information, contained in the Initial Context Setup Request message and transmit an RRC Connection Reconfiguration message to the MCPTT UE 100 to establish a bear between the UE 100 and the eNB 200 at step S465.

After establishing the bearer with the UE 100, the eNB 200 may transmit an Initial Context Setup Response message at step S470 to notify the MME 300 of the bearer ID indicating the bearer established with the QoS configured by the MME 300 in response to the Initial Context Setup Request message.

Upon receipt of the Initial Context Setup Response message, the MME 300 may transmit a Modify Bearer Request message to the S-GW/P-GW 400 at step S475 and request for establishing a bearer connection between the eNB 200 and the S-GW/P-GW 400 at step S480. The bearer established between the UE 100 and the S-GW/P-GW 400 via the eNB 200 supports the QoS configured by the MME 300 to be fit for the MCPTT type such that the data transfer on the bearer may be handled with priority in comparison with those on other bearers.

After the bearer has been established, the P-GW 400 may modify the IP-CAN session with the PCRF 600 at step S485. the P-GW 400 may transmit the information on the newly established bearer and UE information to the PCRF 600 to update a PCC rule for use in charging or providing services.

After the bearer has been established, the MCPTT UE 100 may receive the MCPTT service with priority according to the request from the MCPTT application server 800.

The MME 300 may modify the context of the previously established default bearer to establish a bearer with a high priority and, in this case, the embodiment of FIG. 1 is applied. Alternatively, it may also be possible to establish the bearer in such a way of activating the secondary default bearer context and, in this case, the embodiment of FIG. 2 is applied.

Alternatively, the MME 300 may establish a dedicated bearer for the service with a high priority. In this case, both the default bearer and dedicated bearer are established and, in this case, the MCPTT UE 100 to receive the MCPTT service through the dedicated bearer. Alternatively, the MME 300 may establish a new bearer and, in this case, the previous bearer contexts are deactivated and a new bearer is established according to the new bearer context determined by the MME 300.

Figure 5:
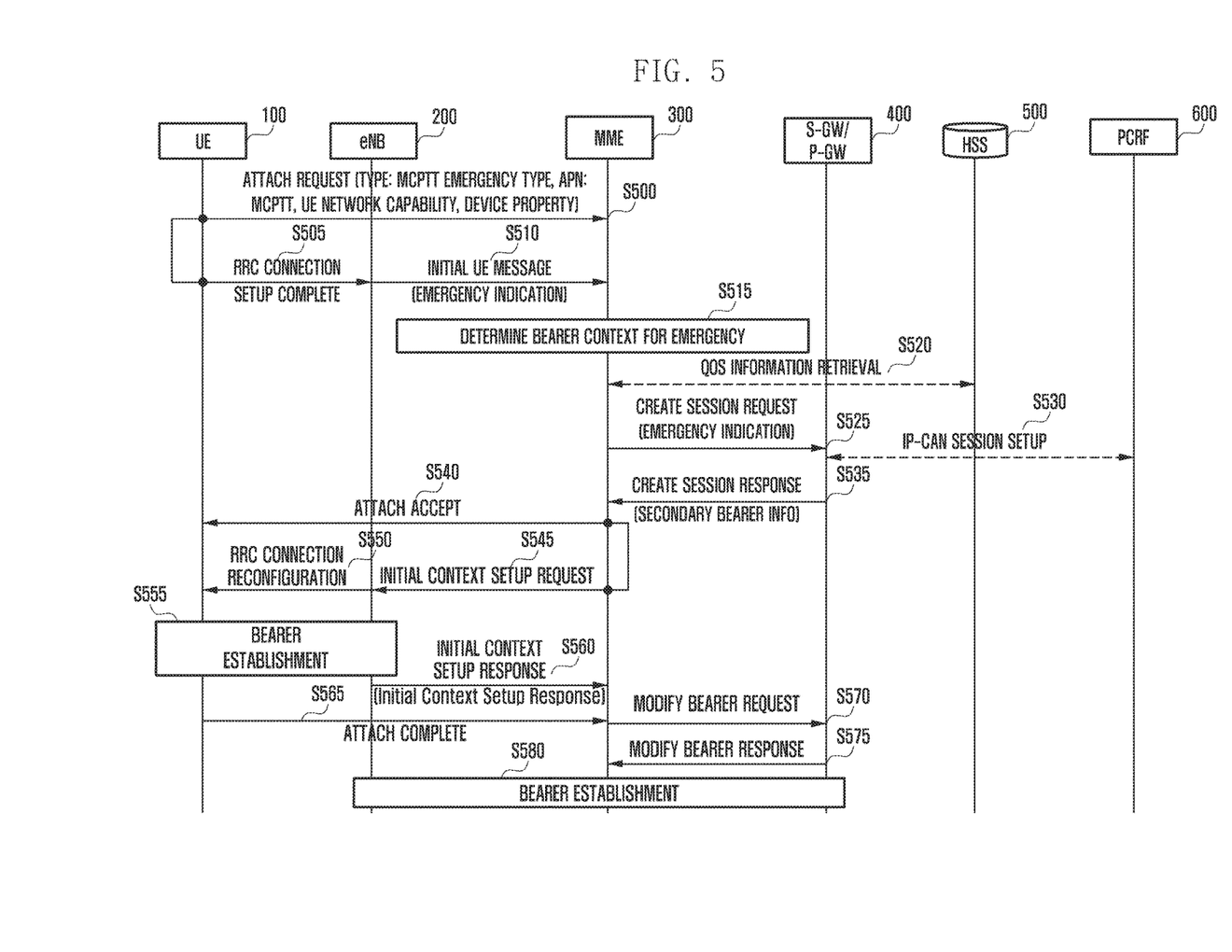
FIG. 5 is a signal flow diagram illustrating a procedure for establishing a bearer for sue of a public security network in which a UE that wants to use the public safety network transmits an Attach Request message in order for an MME to establish the bearer for use of the public safety network according to an embodiment of the present invention.

FIG. 5 is a signal flow diagram illustrating a procedure for establishing a bearer for sue of a public security network in which a UE that wants to use the public safety network transmits an Attach Request message in order for an MME to establish the bearer for use of the public safety network according to an embodiment of the present invention. In detail, FIG. 5 depicts a method and procedure for establishing a bearer for receiving the MCPTT service in such a way that an MCPTT UE notifies an MME of its MCPTT capability and its interest in use of the MCPTT service during the attach procedure to the EPS network.

It is obvious that the term 'emergency' in use for the following description with reference to the drawing is intended to indicate the collective MCPTT service, MCPTT Emergency, or one of detailed MCPTT services.

The MCPTT UE 100 may transmits to the MME 300 an Attach Request message including at least one of MCPTT type and MCPTT capability information at step S500.

In detail, the MCPTT UE 100 may perform an Attach procedure to attach to the EPS network. The MCPTT UE 100 may transmit to the MME 300 an Attach Request message including its MCPTT capability as follows. For example, the MCPTT UE 100 may set the type field of the Attach Request message to a value indicating MCPTT or MCPTT Emergency. The MCPTT UE 100 may also set the Access Point Name (APN) field of the Attach Request message to a value indicating MCPTT APN to notify that it wants to access the MCPTT service. The MCPTT UE 100 may also set the UE network capability field or the device property of the Attach Request message to a value indicating its MCPTT capability. The MCPTT UE 100 may notify the MME 300 that it is an MCPTT UE using at least one of the above methods and may indicate the necessity of MCPTT bearer establishment using the type and APN fields of the Attach Request message as a result of the Attach procedure. If the UE sets the UE network capability and device property fields to a value indicative of MCPTT, this means that the UE 100 has the MCPTT capability.

The MCPTT UE 100 may transmit a RRC Connection Complete message to the eNB 200 at step S505 and, upon receipt of the RRC Connection Complete message, the eNB 200 may transmit an Initial UE message including an indicator indicative of the public safety network to the MME 300 at step S510.

In detail, if the Attach Request message is received, the MME 300 may configured a secondary bearer context of the MCPTT service in advance for the UE 100. The MCPTT UE 100 transmit the Attach Request message configured as described above by means of a RRC Connection Setup Complete message during the RRC Connection procedure, the RRC Connection Setup Complete message including an indicator indicating that the message should be handled with priority for the MCPTT service. If the RRC Connection Setup Complete message conveying the Attach Request message along with the indicator is received from the MCPTT UE 100, the eNB may process the Attach Request message from the UE 100 with priority in comparison with those transmitted by other UEs.

The eNB 200 may transmit to the MME 300 the Initial UE message including the Attach Request message and the indicator indicating that the message should be handled with priority. Upon receipt of the UE message, the MME 300 may process the Attach Request message transmitted by the eNB with priority in comparison with those transmitted by other eNB s.

The MME 300 may determine a bearer context for the public safety network at step S515.

In detail, the MME 300 checks the Attach Request message included in the Initial UE message and determine the context of the bearer for the MCPTT UE 100 based on a value included in the Attach Request message. For example, if the type field of the Attach Request message is set to a value indicating Emergency and the APN field of the Attach Request message is set to a value indicating MCPTT APN, the MME 300 may determine that the UE is requesting for an MCPTT Emergency bearer. Likewise, if the type field of the Attach Request message is set to a value indicating MCPTT Emergency, the MME 300 may determine to configure a bearer context for the MCPTT Emergency for the UE 100. Although the type field of the Attach Request message, if the UE network capability field or the Device property field is set to a value indicating MCPTT, the MME 300 may determine the bearer context appropriate for the QoS designated for the MCPTT service and store the bearer context in the form of Secondary Default Bearer Context for preparing for the UE's use of the MCPTT service.

After determining the bearer context as described above, the MME 300 may inquire to the HSS 500 about the QoS information and acquires the QoS information from the HSS 500 at step S520 and perform an authentication procedure to determine whether the UE 100 which has transmitted the Attach Request message supports the high QoS. This process may be omitted and, in this case, the MME may use its internal MME Emergency Configuration data or a value stored in an alternative method.

Meanwhile, the MME 300 may transmit to the S-GW/P-GW 400 a Create Session Request message including an indicator indicating the public safety network at step S525.

For example, the MME 300 may transmit the Create Session Request message to the S-GW/P-GW 400 for establishing a bearer for the UE 100 which has transmitted the Attach Request message and, in this case, the Create Session Request message may include an Indication Flag, a Signaling Priority Indication, or a QoS of the bearer Context which is set to a value indicating a high priority in order for the S-GW/P-GW 400 to process the Create Session Request message with priority.

If the Create Session Request message is received, the S-GW/P-GW 400 may check the Indication flag or the signaling priority indication so as to process the message with priority in comparison with the requests from other UEs or MMEs; it may also check the QoS field included in the bearer information and, if the QoS field is set to a QCI or ARP value of a high priority equivalent to that of the Emergency, determine to process the request with priority.

Meanwhile, the P-GW 400 may perform an IP-CAN session setup with the PCRF 600 at step S530. The P-GW 400 may transmit to the MME 300 a Create Session Response message including secondary bearer information at step S535.

For example, the P-GW 400 may accept the Create Session Request and negotiate with the PCRF 600 to update the PCC rule. Afterward, the P-GW 400 may transmit the Create Session Response message in response to the Create Session Request message, the Create Session Response message including information on the secondary default bearer which is activated when the MCPTT UE 100 wants to use the MCPTT service or the default bearer to be currently activated for the MCPTT UE 100.

The MME 300 may transmit an Attach Accept message to the MCPTT UE 100 at step S540. Then, the MME 300 may transmit an Initial Context Setup Request message to the eNB at step S545.

In detail, the MME 300 may transmit to the eNB 200 the Initial Context Setup Request message including the Attach Accept message and the bearer context information. Then, the eNB 200 may transmit to the UE 100 an RRC Connection Reconfiguration message including the Attach Accept message at step S550 and establish a bearer with the UE 100 according to the bearer context information included in the Initial Context Setup Request message at step S555.

The eNB may transmit an Initial Context Setup Response message to the MME to inform of the bearer establishment at step S560.

In detail, if a bearer is established between the UE 100 and the eNB 200, the eNB 200 may transmit the Initial Context Setup Response message to the MME 300 to notify the MME 300 that the bearer has been established.

The UE 100 may transmit an Attach Complete message to the MME 300 at step S565.

Then, the MME 300 may transmit a Modify Bearer Request message to the S-GW/P-GW 400 at step S570. The S-GW/P-GW 400 may transmit a Modify Bearer Response message to the MME 300 at step S575 and, as a consequence, a bearer is established between the eNB 200 and the S-GW/P-GW 400 at step S580.

That is, the MME 300 establishes a bearer between the eNB 200 and the S-GW/P-GW 400 by transmit the Modify Bearer Request message to the S-GW/P-GW 400, and the UE 100 transmits the Attach Accept message to the MME 300 to complete the Attach procedure.

Figure 6:
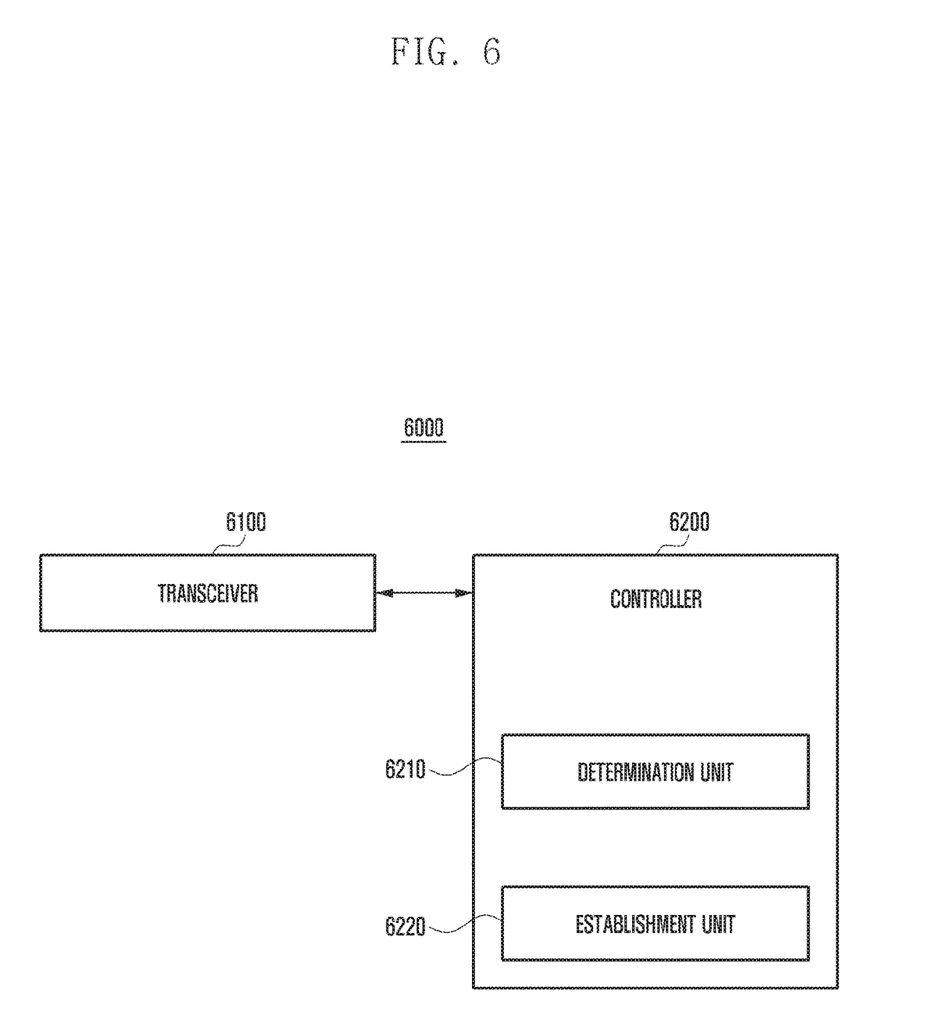
FIG. 6 is a block diagram illustrating a configuration of an MME according to an embodiment of the present invention.

FIG. 6 is a block diagram illustrating a configuration of an MME according to an embodiment of the present invention. As shown in FIG. 6, the MME 6000 may include a transceiver 6100 and a controller 6200.

The transceiver 6100 may transmits and receives signals. For example, the MME 6000 may transmit and receive signals to and from a base station or a P-GW by means of the transceiver 6100.

The controller 6200 may control the overall operations of the MME 6000. As described above, the controller 6200 may control the transceiver 6100 to transmit a first message including information on a public safety network. The controller 6200 may control to establish a bearer with a priority higher than that of a preconfigured bearer based on the received message.

Meanwhile, a public safety network may include the MCPTT.

The information on the public safety network may include at least one of MCPTT type and MCPTT capability of a UE.

The first message may be a service request message. The controller 6200 may determine the type of the MCPTT service for the UE based on the information included in the service request message and inquire to an HSS about the QoS for use of the MCPTT service based on the determined MCPTT service type.

If the QoS information is received form the HSS by means of the transceiver 6100, the controller 6200 may control to modify the context of the first default bearer for the UE based on the received QoS information.

The controller 6200 may store a secondary default bearer context for the MCPTT service before receiving the service request message from the terminal. if the service request message is received, the controller 6200 may determine the type of the MCPTT service based on the information included in the service request message.

The controller 6200 may determine a bearer context based on the type of the MCPTT service from the stored secondary default bearer context and activates secondary default bearer according to the determined bearer context.

The first message may be an attach request message including at least one of the MCPTT type and MCPTT capability information of the UE. The controller 6200 may determine the bearer context based on the information included in the attach request message and establish the bearer according to the determined bearer context.

The controller 6200 may receive a second message including the information on the public safety network from a P-GW.

The second message may be a downlink data notification (DDN) message. If the DDN message is received from the P-GW, the controller 6200 may control to transmit a paging signal including a public safety network identifier to an eNB; if the UE receives the paging signal and transmits a response to the eNB, the controller 6200 may control to receive a message including the bearer setup request message from the eNB. The controller 6200 may determine the bearer context and establish the bearer according to the received request.

The second message may be an update bearer request message including a QoS for establishing a bearer for the public safety network determined by the P-GW based on the signal transmitted by an application server.

The controller may control to establish the bearer based on the QoS included in the bearer request message.

According to an embodiment, the controller 6200 may further include a determination unit 6210 and an establishment unit 6220. The determination unit 6210 may determine that the message is transmitted by the PDCCH UE based on the information included in the received message and necessity of establishing a bearer for the public safety network.

The determination unit 6210 may determine a bearer context for establishing a bearer for the public safety network.

The establishment unit 6220 may establish a bearer according to the determination result of the determination unit 6210. For example, the establishment unit 6220 may modify the default bearer context to establish a bearer based on the determination result.

The components of the controller 6200 may be implemented in software. For example, the controller 6200 may include a flash memory or other nonvolatile memory. The nonvolatile memory may store programs for performing the operations of the determination unit 6210 and the establishment unit 6220 respectively.

The controller 6200 may be implemented in the form of including a Central Processing Unit (CPU) and a Random-Access Memory (RAM). The controller 6200 may copy the programs from the nonvolatile memory to the RAM and execute the aforementioned operations.

The term 'controller' may be intended to include a central processing unit, a microprocessor, a control unit, a processor, and an operating system. The controller 6200 of the MME 6000 may be implemented in the form of a single chip (system-on-a-chip, system on chip, SOC, or SoC) along with other function blocks.

As described above, the MME may establish a bearer with a priority higher than that of a preconfigured bearer to make it possible for the UE to use the public safety network safety network service easily.

The bearer establishment method according to various embodiments of the present invention may be coded in software and stored in a non-transitory readable medium. Such a non-transitory readable medium may be mounted in various devices.

The non-transitory readable medium is a machine-readable medium capable of storing data semi-persistently unlike a transitory storage medium storing data temporarily such as register, cache, and memory. Examples of the non-transitory readable medium may include compact disk (CD), digital versatile disk (DVD), hard disk, Blu-ray disk, universal serial bus (USB), memory card, and read-only memory (ROM).

Although preferred embodiments of the invention have been described using specific terms, the specification and drawings are to be regarded in an illustrative rather than a restrictive sense in order to help understand the present invention, it is obvious to those skilled in the art that various modifications and changes can be made thereto without departing from the broader spirit and scope of the invention and such modifications and changes should not be understood individually from the technical spirit or prospect of the present disclosure.

The invention claimed is:

1. A bearer establishment method of a mobility management entity (MME), the method comprising:
   receiving a service request message for a public safety service, the service request message including information on a mission critical push to talk over long-term evolution (MCPTT) type;
   determining a type of an MCPTT service based on the information on the MCPTT type; and
   establishing a bearer with a priority higher than a priority of a preconfigured bearer based on the type of the MCPTT service.

2. The method of claim 1, wherein the service request message includes information on an MCPTT capability of a terminal, and wherein establishing of the bearer comprises establishing the bearer with the priority higher than the priority of the preconfigured bearer based on the MCPTT capability of the terminal.

3. The method of claim 1, wherein establishing the bearer comprises:
   inquiring to a home subscriber server (HSS) about quality of service (QoS) information for use of the MCPTT service based on the type of the MCPTT service; and
   modifying a context of a first default bearer for a terminal based on the QoS information acquired from the HSS.

4. The method of claim 3, wherein establishing the bearer comprises:
   storing a secondary default bearer context for the MCPTT service before receiving the service request message from the terminal;
   determining a bearer context based on the type of the MCPTT service in the secondary default bearer context; and
   activating a secondary default bearer based on the determined bearer context.

5. The method of claim 1, wherein receiving the first service request message comprises receiving a downlink data notification (DDN) message including information on a public safety network from a packet data network gateway (P-GW).

6. The method of claim 5, wherein establishing the bearer comprises:
   transmitting a paging signal including a public safety network identifier to a base station;
   receiving, when a terminal receives the paging signal via the base station and transmits a response to the base station, a message including a bearer configuration request from the base station; and
   determining a bearer context to configure the bearer according to the bearer configuration request,
   or
   wherein the DDN message is an update bearer request message including a quality of service (QoS) value for establishing the bearer for the public safety network determined by the P-GW according to a signal transmitted by an application server, and
   establishing the bearer comprises:
   establishing the bearer based on the QoS value included in the update bearer request message.

7. The method of claim 1, wherein the service request message is an attach request message, and establishing the bearer comprises:
   determining a bearer context based on information included in the attach request message; and
   establishing the bearer based on the determined bearer context.

8. A mobility management entity (MME) comprising:
   a transceiver configured to transmit and receive signals; and
   a controller configured to:
   control the transceiver to receive a service request message for a public safety service, the service request message including information on a mission critical push to talk over long-term evolution (MCPTT) type,
   determine a type of an MCPTT service based on the information on the MCPTT type, and
   establish a bearer with a priority higher than a priority of a preconfigured bearer based on the type of the MCPTT service.

9. The MME of claim 8, wherein the service request message includes information on an MCPTT capability of a terminal, and wherein the controller is further configured to establish the bearer with the priority higher than the priority of the preconfigured bearer based on the MCPTT capability of the terminal.

10. The MME of claim 8, wherein the controller is further configured to:
    inquire to a home subscriber server (HSS) about quality of service (QoS) information for use of the MCPTT service based on the type of the MCPTT service, and
    modify a context of a first default bearer for a terminal based on the QoS information acquired from the HSS.

11. The MME of claim 9, wherein the controller is further configured to:

store a secondary default bearer context for the MCPTT service before receiving the service request message from the terminal, determine a bearer context based on the type of the MCPTT service in the secondary default bearer context, and activate a secondary default bearer based on the determined bearer context.

12. The MME of claim 8, wherein the controller is further configured to control the transceiver to receive a downlink data notification (DDN) message including information on a public safety network from a packet data network gateway (P-GW).

13. The MME of claim 8, wherein the controller is further configured to:

control the transceiver to transmit a paging signal including a public safety network identifier to a base station, control the transceiver to receive, when a terminal receives the paging signal via the base station and transmits a response to the base station, a message including a bearer configuration request from the base station, and determine a bearer context to configure the bearer according to the bearer configuration request.

14. The MME of claim 12, wherein the DDN message is an update bearer request message including a quality of service (QoS) value for establishing the bearer for the public safety network determined by the P-GW according to a signal transmitted by an application server, and the controller is further configured to establish the bearer based on the QoS value included in the update bearer request message.

15. The MME of claim 8, wherein the first service request message is an attach request message, and the controller is further configured to determine a bearer context based on information included in the attach request message and establish the bearer based on the determined bearer context.

* * * * *